W. SWARTHOUT.
Car-Trucks.
No. 161,989.  Patented April 13, 1875.
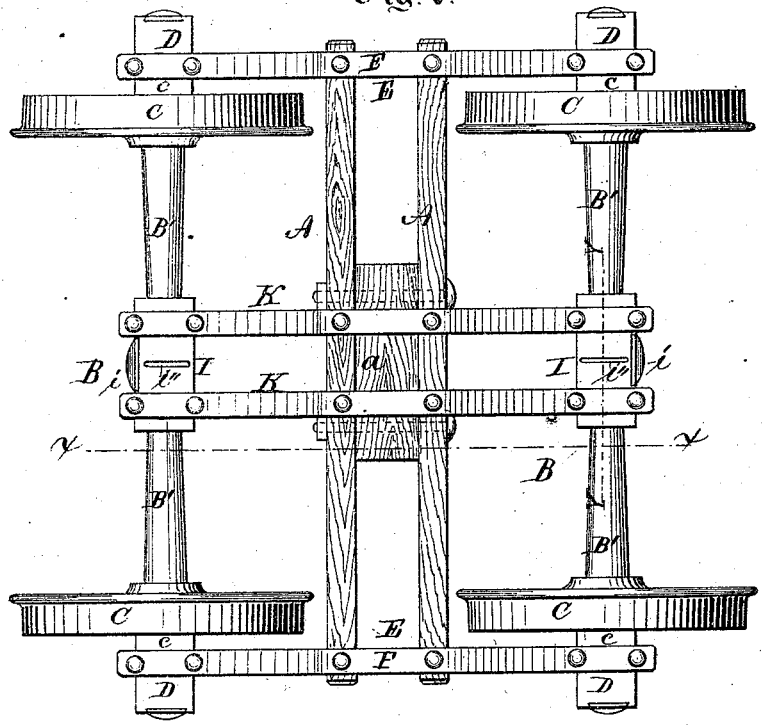
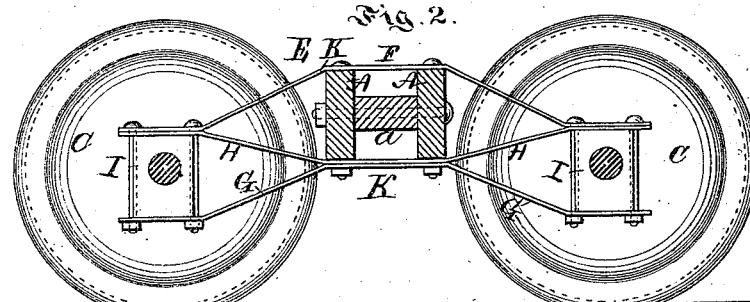
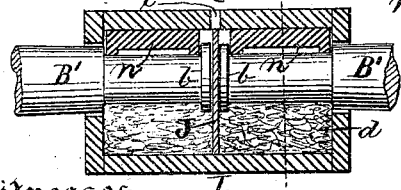 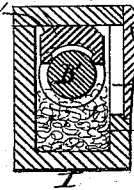 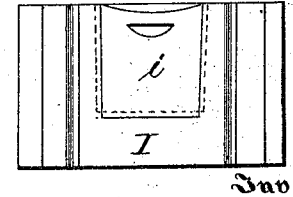
Witnesses:
A. McCallum
D. G. Stuart
Inventor:
William Swarthout,
by W. B. Richards,
Atty.
THE GRAPHIC CO.PHOTO.-LITH.39 & 41 PARK PLACE,N.Y.

UNITED STATES PATENT OFFICE.

WILLIAM SWARTHOUT, OF QUINCY, ILLINOIS.

IMPROVEMENT IN CAR-TRUCKS.

Specification forming part of Letters Patent No. 161,989, dated April 13, 1875; application filed January 2, 1875.

*To all whom it may concern:*

Be it known that I, WILLIAM SWARTHOUT, of Quincy, in the county of Adams and State of Illinois, have invented certain Improvements in Railway-Car Trucks, divided axles, and journal-boxes, of which the following is a specification:

This invention relates to improvements in railway-car trucks, and consists in improvements in the union-box for supporting the adjacent ends of the divided axle, all as hereinafter fully described.

To enable others skilled in the art to make and use my invention, I will now proceed to describe the same with reference to the accompanying drawing, in which—

Figure 1 is a plan view of a truck embodying my improvement. Fig. 2 is a sectional view on the line $x\ x$ of Fig. 1, and Fig. 3 is a detail sectional view on the line $y\ y$ of the same figure. Fig. 4 is a section of Fig. 3 on the line $x'\ x'$. Fig. 5 is a side elevation of Fig. 3.

Referring to the parts by letters, letters A A represent two beams, forming the main transverse timbers of the truck-frame, connected near their centers by a block, $a$. B B are the axles, each formed of two parts, B' B', as shown at Fig. 3. C C are the wheels, shrunk or pressed in the ordinary manner, one on each short axle B', so as to rotate with the axle. The axles B' extend through the wheels C, and their outer ends are formed into the ordinary journals $c$, which have bearings in ordinary axle-boxes D. The axle-boxes D are supported at the ends of trusses E, formed by a plate, F, tie G, and brace H, the central part of which is attached to and sustained by the transverse framing-bars A. I is a double box, for sustaining the adjacent ends of the divided axles B'. The box I is formed, as plainly shown in the drawings, with a cap, $i$, covering an opening, $i'$, on one side, through which access may be had to the interior, and with an opening, $i''$, in its upper side, through which a plate, J, may be inserted or removed, which divides the box into two compartments, and which serves as an abutment for the adjacent ends of the divided axle. K K are trusses, formed of similar parts to the trusses E, and in the drawings have like parts, lettered similarly to same parts at said trusses E. The union-boxes I are supported at the ends of the trusses K, as shown in the drawings. Other methods of securing the boxes to the trusses may, however, be used.

The interior of the boxes D may be formed in any ordinary manner, and provided with the usual brasses $d$ and lubricant-vehicle $d'$. The adjacent ends of the axles B' have each a collar, $b$, thereon, in rear of which the brasses or bearing-blocks $n$ are placed, as shown at Fig. 3.

The cars are mounted above the truck in any ordinary manner, their weight being received directly upon the transverse bars A, which are, in turn, supported on the wheels by the trusses E. The trusses K support no weight of the load, but simply serve as supports for the boxes I, and to sustain the inner ends of the axles B'.

The brasses $n$ may be removed by first removing the plate J through the opening $i''$, which will allow them to be drawn over and opposite, and thence through the opening $i'$.

The axle constructed of one piece of metal, and with the wheels fixed firmly thereon, is subject to severe torsional strain, and the slipping of the wheel is equivalent to grinding on the rail, rapidly destroying it and greatly retarding the train. The divided axle is a complete remedy for these defects of the entire axle, and it will be seen that the within-described construction thereof, and method of supporting the same, dispense with all complication of parts and consequent liability to get out of repair.

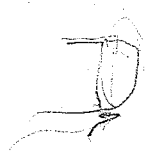

Having thus described my invention, what I claim as new, and desire to secure by Letters Patent, is—

The box I, having openings $i'\ i''$, plate J, and brasses $n\ n$, in combination with the axles B', substantially as and for the purpose set forth.

WILLIAM SWARTHOUT.

Witnesses:
 J. H. McGINDLEY,
 MANLY D. BARBER.